Dec. 5, 1950     LE GRAND DALY     2,532,442
MOLDED ARTICLE

Original Filed March 9, 1942     3 Sheets-Sheet 1

Inventor

LeGRAND DALY
By Gregory S. Dolgorukov
Attorney

Dec. 5, 1950      LE GRAND DALY      2,532,442
MOLDED ARTICLE

Original Filed March 9, 1942      3 Sheets-Sheet 2

Inventor
LeGRAND DALY
By Gregory S. Dolgorukov
Attorney

Dec. 5, 1950        LE GRAND DALY        2,532,442
MOLDED ARTICLE
Original Filed March 9, 1942        3 Sheets-Sheet 3
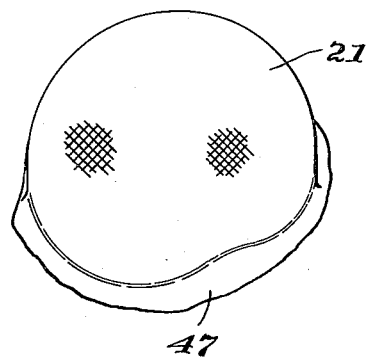
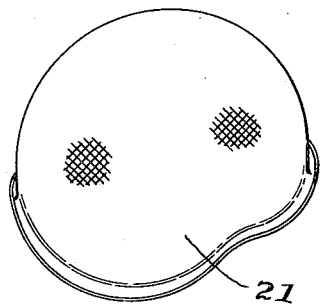
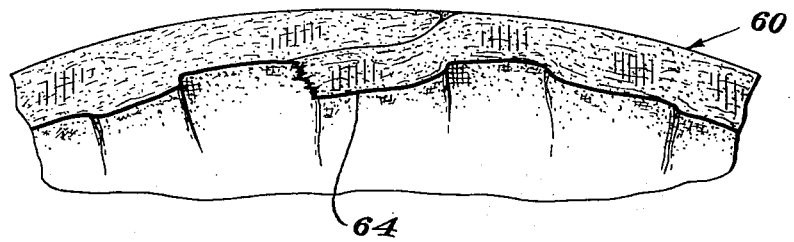
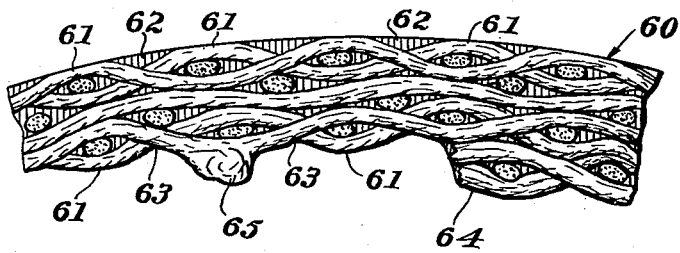
Inventor
LeGRAND DALY
By Gregory S. Dolgorukov
Attorney Patented Dec. 5, 1950

2,532,442

UNITED STATES PATENT OFFICE 2,532,442

MOLDED ARTICLE

Le Grand Daly, Birmingham, Mich.

Original application March 9, 1942, Serial No. 433,943, now Patent No. 2,420,522, dated May 13, 1947. Divided and this application April 2, 1947, Serial No. 738,960

3 Claims. (Cl. 2—3)

This invention relates to an improved molded article, and more particularly to an article made from plastic impregnated cloth or fabric. The present application is a division of my co-pending application Ser. No. 433,943 filed March 9, 1942, now Patent No. 2,420,522 dated May 13, 1947.

Heretofore considerable difficulties have been encountered in the art of making articles of the above general character and particularly in forming them to shapes including relatively deep "draws" or curved surfaces. Under one method of conventional practice of making such articles a flat sheet or a mat is first built-up of a desirable number of alternating layers of uncured plastic material and fabric; thereupon such flat sheet is operated upon in a die apparatus of a relatively powerful press and formed to desired shape between the correspondingly shaped punch and die of said apparatus, similarly to stamping metals. The die apparatus is usually heated in some suitable way in order to soften the plastic material and/or to effect curing thereof. Very high forming pressures such for instance as 5000 lbs. per square inch produced mechanically or hydraulically have been considered necessary to effect proper forming and molding, in consequence whereof molding dies have been usually made similar to the dies used for stamping metals, i. e. of heavy cast steel construction with hand shaped forming portions. Making such dies is a very tedious work requiring high skill and long time, and therefore in view of the high cost of molding dies and the necessity of using heavy powerful presses, setting-up for production even of a relatively small article of the foregoing character required relatively large investment and a long time. In addition to the above, still more serious difficulties have been confronted due to the fact that when the shape of the article produced included portions of considerable curvature or deep draws, damaging fibers of the reinforcing fabric in some sections of such curved portions and formation of folds or wrinkles in others were extremely difficult to avoid. The latter difficulty is due to the inability of cloth or of fabric fibers to stretch or "form" as much as it is necessary in order that a flat sheet of a fabric material would assume a curved shape. In other words, while stretching of metal fibers and "flow" of metal within a metal sheet during stamping is considerable and may be carried on practically indefinitely by alternating forming and annealing of the stamped blank, such stretching and "flow" of material cannot be achieved in fabrics, and forming operations on flat pieces of fabric reinforced plastic materials invariably result in severely damaging the fabric fibers, formation of folds, high percentage of scrap and production of articles of inferior quality, often at high cost.

In making articles such as safety helmets attempts have been made to cut out pieces of plastic impregnated fabric in the shape forming a geometric development into the shape of the helmet, fitting the meeting edges of the piece into substantially abutting relationship. Several pieces of such a nature are then assembled, with staggering of their abutting joints, and the pieces are molded in the molding dies into a helmet. It has been found, however, that fitting the edges of such pieces is a tedious work and that shifting of such pieces in the mold may cause separation of some of such abutting joints in some places, folds and high spots in others. In consequence thereof, the high spots so produced are crushed by the dies, squeezing out the plastic and producing so-called "dry spots," or places with insufficient plastic bond and often damaged fibers, while in other places excessive resin accumulates in the so-called "resin pockets." The helmet or other article so produced is usually spotty in appearance, having light "dry spots" and dark "resin pockets," and its strength and shock-resisting capacity is decreased. Moreover, the abutting joints with "fitted" edges have very little strength, and if such joints are running to the very edge of the article, such as to the very edge of the brim of a safety helmet, such helmets often fail along such seams under relatively light shock loads. In addition, such joints in the edge of the brim of a safety helmet form places where separation of the bonded cloth pieces may originate.

A large amount of inventive effort has heretofore been directed by those skilled in the art to the solution of the above problem. It was proposed, for instance, to use a knit preform individually made for each article such as a helmet, which preform is easily stretchable to desired shape. However, the cost of knitting such preforms is relatively high, and in many cases it is prohibitive for production in moderate quantities or for experimental work, since it may require ordering such preforms from special mills and necessitate special set-up of machines for each special form. It was also proposed to use glass fiber fabrics of an open mesh weave and with fibers so slippery as to permit forming "deep draws" by distorting the weave. While such expedients have solved some of the above discussed problems, they have introduced new difficulties preventing wider acceptance of such proposals.

One of the objects of the present invention is to provide an improved article molded from plastic impregnated cloth or fabric which article is of such a construction as to overcome and largely eliminate the above difficulties.

Another object of the invention is to provide an improved molded article made of plastic treated substantially unstretchable or "unformable" fabrics without distorting the fabric or texture thereof, forming wrinkles and folds, weakened or broken fibers of the fabric, with the fabric retaining its original strength.

A further object of the invention is to provide an improved article molded of plastics treated cloth, which article has no concealed internally weakened sections, not detectable by an outside visual inspection.

A still further object of the present invention is to provide an improved molded article which is manufactured with the aid of very simple apparatus and does not require making of special molding dies or use of large presses.

A still further object of the present invention is to provide an improved molded article which can be molded in a sheet metal mold, or against a sheet metal model of the article.

A still further object of the present invention is to provide an improved two-piece military helmet, having a steel shell and an inlay made of plastic treated pieces of flat fabric, said inlay being molded against a helmet steel shell as a mold.

A still further object of the present invention is to provide an improved article molded from plastic treated fabric in which no excess of plastic is accumulated in any portion thereof, or as expressed in the terminology of the art "no plastic or resin pockets" are present.

A still further object of the present invention is to provide an improved article molded from plastic treated layers of flat substantially unformable fabric, said layer being slitted or cut and folded to the approximate shape of the article or its portion, the edges of the fabric in the same layer overlapping each other for a substantial distance, and without attempts being made to make said edge abutting each other.

A still further object of the present invention is to provide an improved substantially hollow article molded from plastic treated pieces of fabric, one surface of said article being smooth, and the other surface being relatively rough with overlaps and raised spots projecting inwardly rather than being crushed to produce smooth inner surface as has been common in the prior art.

A still further object of the present invention is to provide an improved article of the character specified in the preceding paragraph, in which article all its portions were subjected to substantially uniform molding pressure in spite of varying thickness due to the presence of overlaps and high spots.

It is an added object of the present invention to provide an improved molded article of the foregoing character which is simple in construction, sanitary and dependable in use, and is inexpensive to manufacture.

Other objects of this invention will appear in the following description and appended claims, reference being had to the accompanying drawings forming a part of this specification wherein like reference characters designate corresponding parts in the several views.

Fig. 7 is a perspective view illustrating a molded inlay blank as the same comes out of the mold.

Fig. 8 is a perspective view illustrating the inlay blank of Fig. 7 after the same has been properly trimmed.

Fig. 9 is a fragmentary perspective view showing in a somewhat schematic form the brim edge of the inlay.

Fig. 10 is a fragmentary section through the wall of the helmet showing in a somewhat emphasized manner the smooth outside surface and the rough inside surface with raised spots, such as are formed by overlaps, knots, and the like.

Figure 1:
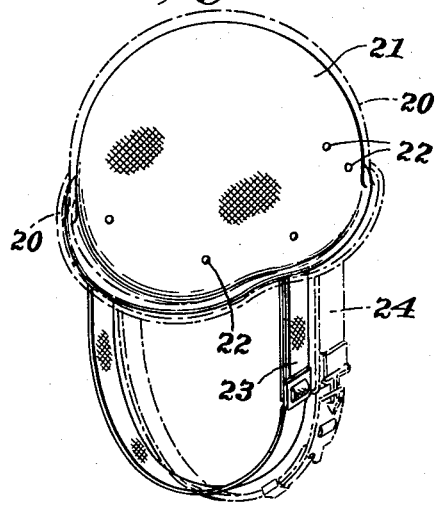
Fig. 1 is a perspective view illustrating a two-piece military helmet including a liner or inlay embodying the present invention and made in accordance therewith. The steel shell of the helmet and the chin strap of the steel shell are shown in dotted lines.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown, by way of example, an improved military helmet of two-piece construction, including a liner or inlay made from plastic impregnated fabric. There is hereinafter described in detail and illustrated in the drawings an improved method of making various articles from plastic treated cloths, fabrics or felted fibers, and an improved apparatus for carrying out the molding or final forming and curing of such articles. Said improved method and apparatus are hereinafter disclosed as applied to making a liner or inlay for a two-piece military helmet, shown in the drawings. It will be understood, however, that the present method and apparatus are not limited to making such inlays, but may be applied with equal success for making various other articles from the materials of the above general character, such for instance as parts of motor vehicle bodies, refrigeration cabinets, various sanitary articles and the like. It should also be understood that the term "plastic" as used herein includes various thermosetting and thermoplastic materials which may be used in connection with fabric or fiber reinforcements and molded by application of heat and pressure.

Figure 2:
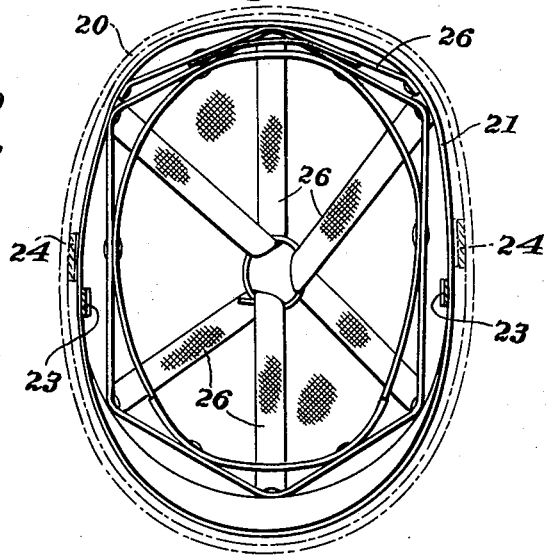
Fig. 2 is a bottom view of the helmet shown in Fig. 1, the chin straps thereof being cut away for the sake of clarity.

Referring now to Figs. 1 and 2 wherein the improved military helmet is illustrated, the same comprises an outside shell 20 made preferably by stamping from sheet steel. Within said helmet shell 20 there is fitted an inlay generally indicated by the numeral 21. Within said inlay 21 there is secured in any suitable manner, such as with the aid of rivets 22, a supporting structure made of a plurality of interconnected straps and adapted to support said inlay on the wearer's head without permitting the inlay to contact the head of the wearer. The inlay is provided with an adjustable chin strap 23, while the shell 20 is similarly provided with a heavier chin strap 24 having a buckle and suitable adjustment means. The inlay supporting structure or suspension generally indicated by the numeral 26 does not of itself form a part of the present invention and therefore no detailed description thereof is deemed necessary herein, this construction being clear from the drawings.

An important advantage of the helmet herein disclosed is found in the fact that the middle portions of the shell 20 and inlay 21 respectively are made somewhat larger than the portions adjacent the edges thereof, and therefore some effort is necessary for forcing the inlay into the shell and for withdrawing said inlay therefrom. By virtue of such a construction easy separation of the shell and inlay under conditions of actual use is prevented. In accordance with the invention the same effect may also be produced by having the lower portion of the walls of the shell and inlay extend parallel to each other on both sides of the helmet and therefore insuring frictional contact between the inlay and the shell at or along large frictional surfaces. This will also prevent any undesirable movement or rocking of the steel shell on the inlay and thus will make the two-piece helmet in its fully assembled condition in effect a one-piece construction and yet will permit attainment of the advantages resulting from its laminated construction, such as the advantage of bullet deflection.

In accordance with the invention there is provided an improved method of making the helmet inlay 21 from plastic treated cloth or fabric as well as various fiber materials. In accordance with the improved method a suitable fabric or fiber material is first treated with plastic of any desirable or suitable character. Various commercially available thermoplastic or thermosetting plastic materials, such as thermoplastic resins, phenol formaldehyde, urea formaldehyde, synthetic resins, synthetic rubber, natural rubber, and the like may be used. Selection of the fabric material depends largely upon the character and use of the article to be made. For military helmet inlays it is preferable to use a closely woven cloth such as ordinary canvas.

In treating the canvas with plastic material which may be done either in any suitable machine or by hand, I prefer to cover with plastic material both surfaces of the canvas completely either by painting or spraying such surfaces. It is preferable to cover only the surfaces of the cloth without actually permitting the plastic material to penetrate through the entire thickness of the cloth and to surround the separate threads or fibers thereof. By virtue of such a treatment it is possible to apply a considerable amount of plastic material to the canvas or cloth and yet to preserve in the cloth a desired degree of softness necessary for proper folding of the cloth pieces in later stages of the inlay making. Such softness is retained by the canvas due to the fact that although the outside surfaces thereof after the plastic material solidifies become somewhat stiff or rigid, the inside of the cloth is still dry and separate fibers may move slightly with respect to each other and to adjust themselves in bending the cloth. It can be understood that should plastic material be driven between the separate fibers and threads into the entire thickness of the cloth as may be done by such plastic applying processes as rolling, after the plastic material solidifies, the separate fibers of the cloth are prevented from moving with respect to each other, and if bending or creasing of the cloth takes place along a particular line, extremely high stresses are imposed on separate fibers along that line, which may easily produce breaking of such over-strained fibers at said line. In actual molding such broken fibers and spaces between them are, of course, filled with plastic and cannot be noticed by an outside examination of the finished article, but nevertheless the strength of the cloth is thereby considerably reduced.

After application of the plastic material to the canvas, the same is dried in any suitable manner depending on the nature and character of the plastic material and may then be used for cutting therefrom pieces of desired outline. When application of the plastic material to the canvas is made on special machines by spraying, large rolls of such plastic treated canvas may be prepared, dried, and stored for later use.

Figure 3:
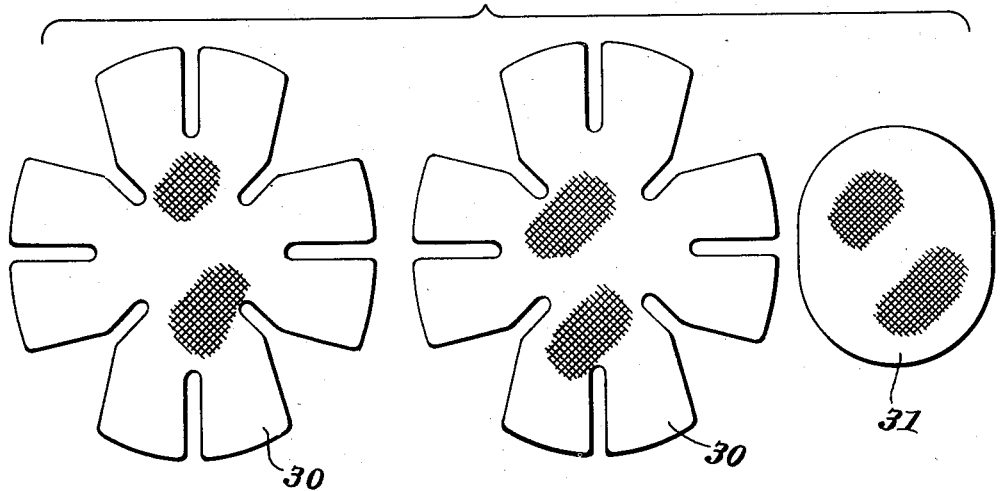
Fig. 3 is an exploded view showing a set of pieces cut out from plastic impregnated cloth from which pieces of a plastic helmet inlay is molded in accordance with the herein disclosed method.

Cutting out of pieces of desired outline from cloth may be done in any suitable manner such as with the aid of scissors or a knife, or with the aid of a suitable blanking die when a considerable number of layers of cloth may be arranged in a die and a corresponding number of pieces cut out in a single stroke of a press. The outline of the pieces cut out for making separate articles depends upon the shape thereof and the number of cloth layers used. In general, the outline of such pieces represents a developade or development surface of the article with some additional material along the seams or places of juncture thereof in order to produce overlapping seams. In addition, local reinforcement pieces may also be provided, outline of said pieces depending upon the character of the desired reinforcement. For the helmet inlay it is preferable to use two star-shaped pieces 30 and a top piece 31, as shown in Fig. 3.

Figure 5:
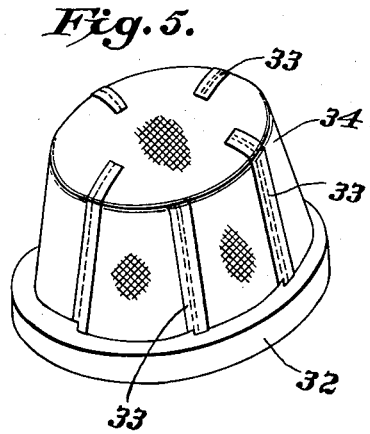
Fig. 5 is a perspective view illustrating one of the star-shaped cloth pieces folded on a form block approximately to the shape of the inlay, with its edges overlapping and the overlap seams or places of juncture being connected together.

Pieces 30 each representing substantially a development of the inlay 21, are folded on a form block to an approximate form of the inlay, as shown in Fig. 5, and the seams are loosely connected in any suitable manner, such for instance as by touching them in places with a heated body such as a soldering iron or by sewing them together with weak thread easily broken. In the drawings such seams or places of juncture of the edges in pieces 30 are indicated by the numerals 33, and the pieces 30 after they are folded are designated by the numerals 34. Seams 33 after the connection therein is effected are additionally painted with the same plastic material in order to insure sufficient quantity thereof at said place of juncture.

Figure 4:
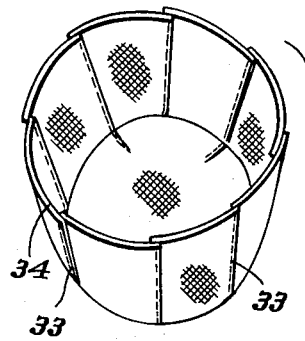
Fig. 4 is an exploded perspective view illustrating cloth pieces of Fig. 3 folded together and ready to be assembled for molding.
Figure 4:
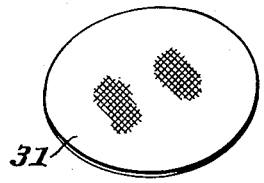
Figure 4:
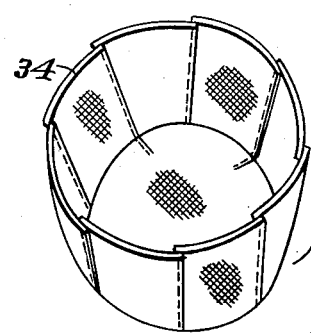

Fig. 4 illustrates two folded pieces 34 and the head reinforcing piece 31 ready to be assembled. In assembly, the head piece 31 is put on the bottom of one of the pieces 34, and thereupon the second piece 34 is inserted into the first piece. It is desirable in the process of such assembly to stagger the seams 33 of pieces 34, thereby insuring a stronger construction.

After the pieces 34 and 31 are thus assembled, they are ready to be finally formed and cured in accordance with the present improved method. Such final forming and curing may be done either in a single step or operation or may be divided into a number of steps, such for instance as into a preforming operation and into the final forming and curing operation. If said final forming and curing is effected in a single operation, the same may be done in a mold illustrated in Fig. 6. Referring to said figure, the mold device illustrated therein comprises a base 36 adapted to receive a hollow dome 37, which dome is separable from said base and may be secured thereto with the aid of any suitable locking devices, such as devices 38. The forming portion of the dome 37 is formed by an actual helmet shell arranged within said dome. In order to indicate that such shell is a part of the actual helmet, the shell used in said dome is indicated by the numeral 20 used in Figs. 1 and 2 for designating the shell of the helmet shown therein. The shell 20 is fitted into the dome 37 in such a manner that it may be securely held therein. The shell may be supported in the dome in any suitable manner, such as by placing plugs between the shell 20 and the walls of the dome or by forming on the walls of said dome suitable lugs 39 which are shaped to contact the walls of the shell 20. The pressure exerting member of the molding device is exemplified by a rubber member or blanket 40 arranged on the base 36 and held in the assembled condition of the molding device between the base 36 and the edges of the dome 37 as can be clearly seen from an examination of Fig. 6. A live steam line 41 controlled by a suitable plug 42 and opening with a port 43 into a steam chamber 47 formed under the blanket 40, is provided for admitting live steam into the mold. Similarly for releasing the exhaust steam from the mold there is provided an exhaust steam line 44 controlled with the aid of a plug 45 and opening into the steam chamber with a port 46.

Figure 6:
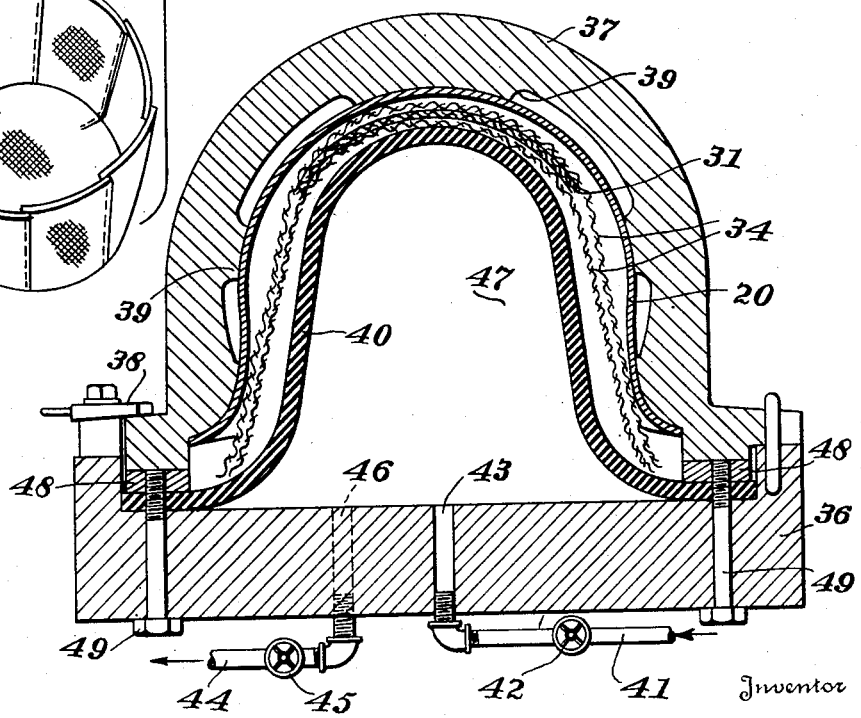
Fig. 6 is a vertical sectional view of a mold for forming and curing the plastic inlay.

When the pieces 34 and 31 are assembled together as described and are ready to be molded, the dome 37 is removed from the base 36 and the assembled pieces are arranged over the upwardly extending middle portion of the blanket 40. Thereupon the dome 37 is placed over the blanket 40 and the assembled pieces, and is secured to the base 36 with the aid of the locking devices 38. Fig. 6 illustrates the assembled molding device with the pieces 34 and 31 arranged therein for final forming and curing. When the mold is so assembled with the pieces arranged therein, the live steam is then slowly admitted by opening the live steam plug 42 and letting the steam enter the chamber 47. The steam entering said chamber 47 heats the blanket 40 and slowly presses it against the assembled pieces 34 and 31 transferring to them by conduction the heat from the blanket 40. Because of heat the plastic material of the assembled pieces softens and as pressure within the chamber 47 increases, the assembled pieces yield to the pressure exerted thereon by the blanket 40, and being pressed by said blanket against the inner walls of the shell 20, they gradually assume the exact shape thereof. Due to the fact that seams 33 are somewhat loose, the edges of the pieces 34 separate in the process of such forming either because of the breaking of the weak threads used in sewing or by melting the spot connections produced by the soldering iron. Thus the cloth is permitted to rearrange itself in the process of molding without imposing any appreciable stresses and strains on the cloth material or fibers thereof. The plastic material being under such condition in its liquid form, internal adjustment of the fibers within separate pieces of cloth also takes place, and therefore the individual fibers under such conditions do not carry any appreciable loads as is the case when they are stretched in a single cloth piece which is being formed with the aid of a die punch of conventional method. By virtue of my improved method the cloth retains its original strength and when the article is molded and the plastic solidifies, the fibers thereof are in a substantially unstrained condition which is not the case with articles produced in accordance with the above described conventional methods.

Another advantage of the present method of molding resides in the fact that pressure within the chamber 47 being equal in all directions, the blanket 40 presses on the assembled pieces uniformly in all directions, thereby permitting only necessary self-adjustment of cloth pieces without distorting their desirable arrangement. It will be understood that should such pieces be formed with the aid of a punch head moving into a forming portion of the die, unless a considerable draft or taper is provided on such walls, the punch may carry some pieces of cloth with it for an appreciable distance due to the friction between the stationary die walls and the movable punch walls with the cloth pieces between them. Such carrying of the pieces may completely disorganize their arrangement within an article and form wide gaps in the finished article, which gaps may, of course, be filled by the plastic and therefore make the defect of decreased strength thereof completely concealed from visual observation and detection.

It can also be understood from an examination of Fig. 6 that by virtue of using a fluid expanded resilient blanket, forms may be produced which could not be stamped with the aid of a conventional molding die because of the fact that a single acting punch cannot be withdrawn therefrom. An additional advantage of the present method resides in the fact that relatively low steam pressures may be utilized and give good results. As has been explained above, in conventional methods pressures such as 5000 pounds per square inch have been considered necessary for effecting proper molding of articles of this general character. With the present improved method selection of the proper pressure depends upon the character of the fabric material used. In small light articles where soft silk is used as the reinforcing material, such pressure may be very low, and in fact, 25 pounds per square inch may give satisfactory results. If on the other hand very heavy closely woven cloth is used in many layers and, in addition, the shape to be produced includes curvature of rather small radii, a higher pressure should be employed. For very smooth finishes higher pressures are also desirable. However, under ordinary conditions it is not necessary to use pressures above 1500 pounds per square inch. In fact, pressure of 1000 pounds per square inch is considered sufficient for rather severe conditions. Thus, with the present improved method the pressure such as indicated above is still five times as small as the average pressures used in conventional methods. In actual practice, however, a much lower pressure than 1000 pounds per square inch is desirable. With the cloth used for the helmet inlays pressures of 100 pounds per square inch gives very satisfactory results and such pressure is preferred.

With the use of the above described method using pressure of approximately 100 pounds per square inch, which pressure implies a corresponding definite temperature of the steam (wet or saturated), the time necessary to effect complete final forming and curing of average materials is approximately five to twenty minutes. With higher pressures and temperatures somewhat different duration of the forming and curing period may be desirable, and the same should be determined experimentally for the particular conditions and materials used.

After the forming and curing process is completed, the live steam plug 42 is closed and the exhaust plug 45 is opened to exhaust the steam and reduce pressure within the chamber 47. Thereupon the dome 37 is disconnected and removed from the base and the formed inlay blank is permitted to cool down. The inlay blank is then removed from the rubber blanket 40 and the rough edges thereof indicated by the numeral 47 of Fig. 7 are trimmed off in any suitable manner. The trimmed edges of the blank are additionally either treated with plastic material or covered with a suitable trimming strip. The blanket then assumes the form illustrated in Fig. 8. Thereupon the supporting structure 26 is riveted to the inlay blank and the chin strap is secured thereto. These operations complete the inlay and the same is now ready for use, either separately or in connection with the shell 20.

It will now be clear in view of the foregoing that in the apparatus described in Fig. 6 steam acts as both the pressure and the heating medium and heat is conducted to the inlay pieces through the blanket 40. Such method and apparatus is very simple and may be successfully used under many conditions.

Referring now to Figs. 9 and 10, it will be seen that the wall of my improved molded article is of such a construction as to possess a number of important advantages. The outside surface of the wall, designated by the numeral 60 is smooth, the valleys between the crests 61 of the separate threads being filled with resin as shown at 62. The resin also binds the separate layers of the fabric as is best shown in Fig. 10. The bottom surface of the wall is relatively rough, since the plastic is driven out even from the valleys between individual threads, as shown at 63, and therefore any overlaps, such as 64, or knots such as 65, produce inwardly projecting high spots. It should also be appreciated that no resin pockets can be present in the wall of my helmet, since excess of liquified plastic in any one spot will be simply squeezed out by the resilient pressure of the rubber blanket. This feature constitutes a very important improvement, since resin, while being a very good binder, is brittle and if collected into relatively large formations having no fabric reinforcement, easily cracks under load. It should be further appreciated, that due to the uniformity of fluid pressure and yielding character of the rubber blanket, all portions of the wall are molded under substantially uniform pressure, and no crushing of overlaps or other unavoidable high spots, such as occur due to immensely high local pressures exerted on high spots of conventionally molded articles of this general nature by the solid steel dies.

It should also be appreciated that the construction of my improved article ensures its substantial strength even if only one layer of fabric with overlapping edges is used. If the overlaps are omitted, and fitting the edges into abutting relationship is attempted, as is done in conventional articles such as safety helmets, a single layer article would easily crack at seams and therefore a plurality of layers and staggering of seams is necessary in such helmets.

It will be understood that under certain conditions it may be desirable to have the inside surface of the article smooth, and outside surface rough. This, of course, can be easily done in accordance with the present disclosure.

There is thus provided an improved molded article made from plastic treated cloth, whereby the above listed objects and numerous additional advantages are attained.

I claim:

1. A one-piece safety helmet molded from at least one flat piece of plastic impregnated substantially unstretchable fabric cut to form a development of said helmet with additional material along its edges, said piece having assumed as a result of molding the shape of the helmet, the meeting edges of said piece overlapping each other for a substantial distance, the outside surface of said helmet being smooth and the inside surface having molded raised spots produced by said overlaps, the thickness of the helmet wall in any particular place thereof being substantially proportional to the number of fabric layers thereat.

2. A one-piece hollow article molded from a plurality of pieces of plastic impregnated substantially unstretchable fabric, said pieces cut to form developments of the corresponding portions of the article with additional material along theirs edges, the hollow of said article being at least in one place larger than the largest opening in the article wall, said pieces having assumed as a result of molding the shape of the article, the meeting edges of said piece overlapping each other for a substantial distance, the outside surface of said article being smooth and the inside surface having molded raised spots produced by said overlaps, the thickness of the wall of the article in any particular place thereof being substantially proportional to the number of fabric layers thereat.

3. A one-piece helmet molded from a plurality of pieces of plastic impregnated substantially unstretchable fabric, said pieces being cut to form developments of the corresponding portions of the helmet with additional material along the adjacent edges of said developments, the hollow of said helmet being at least in one place larger than the largest opening of the helmet, said pieces having assumed as a result of molding the shape of the helmet, the meeting adjacent edges of said pieces overlapping each other for substantial distances, the outside surface of said helmet being smooth and the inside surface having molded raised spots produced by the overlaps, the thickness of the wall of the helmet in any particular place thereof being substantially proportional to the number of fabric layers thereat.

LE GRAND DALY.

REFERENCES CITED

The following references are of record in the file of this patent:

UNITED STATES PATENTS

| Number | Name | Date |
| --- | --- | --- |
| 535,773 | Rowley | Mar. 12, 1895 |
| 1,280,684 | Domanski | Oct. 8, 1918 |
| 1,835,883 | Lewis | Dec. 8, 1931 |
| 1,938,660 | Howard | Dec. 12, 1933 |